US012548913B2

(12) United States Patent
Inafune et al.

(10) Patent No.: US 12,548,913 B2
(45) Date of Patent: Feb. 10, 2026

(54) INVERTED L ANTENNA AND ANTENNA DEVICE

(71) Applicant: KABUSHIKI KAISHA TOKAI RIKA DENKI SEISAKUSHO, Aichi (JP)

(72) Inventors: Koji Inafune, Aichi (JP); Kenichi Koga, Aichi (JP); Tatsuya Koike, Aichi (JP); Satoshi Mori, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 109 days.

(21) Appl. No.: 18/397,010

(22) Filed: Dec. 27, 2023

(65) Prior Publication Data

US 2024/0258702 A1 Aug. 1, 2024

(30) Foreign Application Priority Data

Jan. 30, 2023 (JP) ................................. 2023-011973

(51) Int. Cl.
*H01Q 9/04* (2006.01)
*H01Q 1/38* (2006.01)
*H01Q 9/42* (2006.01)

(52) U.S. Cl.
CPC ................. *H01Q 9/42* (2013.01); *H01Q 1/38* (2013.01)

(58) Field of Classification Search
CPC ............ H01Q 9/42; H01Q 1/38; H01Q 1/243; H01Q 9/0421; H01Q 1/36; H01Q 1/12
See application file for complete search history.

(56) References Cited

U.S. PATENT DOCUMENTS

2004/0080462 A1* 4/2004 Apostolos .............. H01Q 9/145 343/741
2011/0187618 A1* 8/2011 Li ........................ H01Q 9/0421 343/700 MS
2016/0013560 A1* 1/2016 Daniels .................... H01Q 9/42 29/601

FOREIGN PATENT DOCUMENTS

JP 2013-17034 A 1/2013

* cited by examiner

*Primary Examiner* — David E Lotter
(74) *Attorney, Agent, or Firm* — Greenblum & Bernstein, P.L.C.

(57) ABSTRACT

There is provided an inverted L antenna arranged on a substrate, the inverted L antenna comprising: a parallel part arranged in substantially parallel to the substrate; a power feeding point contact part extended from the parallel part substantially perpendicularly to the parallel part; and a leg part formed separately from the power feeding point contact part, and extended from the parallel part substantially perpendicularly to the parallel part, wherein a contact portion of the leg part and the substrate is electrically insulated.

10 Claims, 15 Drawing Sheets

〈VARIATION OF SHAPE OF POWER FEEDING POINT CONTACT PART 114A〉

INVERTED L ANTENNA AND ANTENNA DEVICE

CROSS REFERENCE TO RELATED APPLICATION(S)

This application is based upon and claims benefit of priority from Japanese Patent Application No. 2023-011973, filed on Jan. 30, 2023, the entire contents of which are incorporated herein by reference.

BACKGROUND

The present invention relates to an inverted L antenna and an antenna device.

In recent years, various types of antennas have been developed. The above antennas include, for example, an inverted L antenna as disclosed in JP 2013-17034.

SUMMARY

However, a general inverted L antenna has a structure that stands by itself on a substrate with a single support point interposed therebetween, and therefore lacks stability. In a case where the inverted L antenna has such a structure, there is a probability that the inverted L antenna falls down due to an impact or the like during a manufacturing process or after shipping of a product, and stops functioning.

The present invention has been made in light of the above problem, and an object of the present invention is to provide an inverted L antenna that can be more stably arranged on a substrate.

To solve the above described problem, according to an aspect of the present invention, there is provided an inverted L antenna arranged on a substrate, the inverted L antenna comprising: a parallel part arranged in substantially parallel to the substrate; a power feeding point contact part extended from the parallel part substantially perpendicularly to the parallel part; and a leg part formed separately from the power feeding point contact part, and extended from the parallel part substantially perpendicularly to the parallel part, wherein a contact portion of the leg part and the substrate is electrically insulated.

To solve the above described problem, according to another aspect of the present invention, there is provided an antenna device comprising: a substrate; and an inverted L antenna arranged on a substrate, wherein the inverted L antenna includes: a parallel part arranged in substantially parallel to the substrate; a power feeding point contact part extended from the parallel part substantially perpendicularly to the parallel part; and a leg part formed separately from the power feeding point contact part, and extended from the parallel part substantially perpendicularly to the parallel part, and a contact portion of the leg part and the substrate is electrically insulated.

As described above, the present invention can provide an inverted L antenna that can be more stably arranged on a substrate.

DETAILED DESCRIPTION OF THE EMBODIMENT(S)

Figure 1:
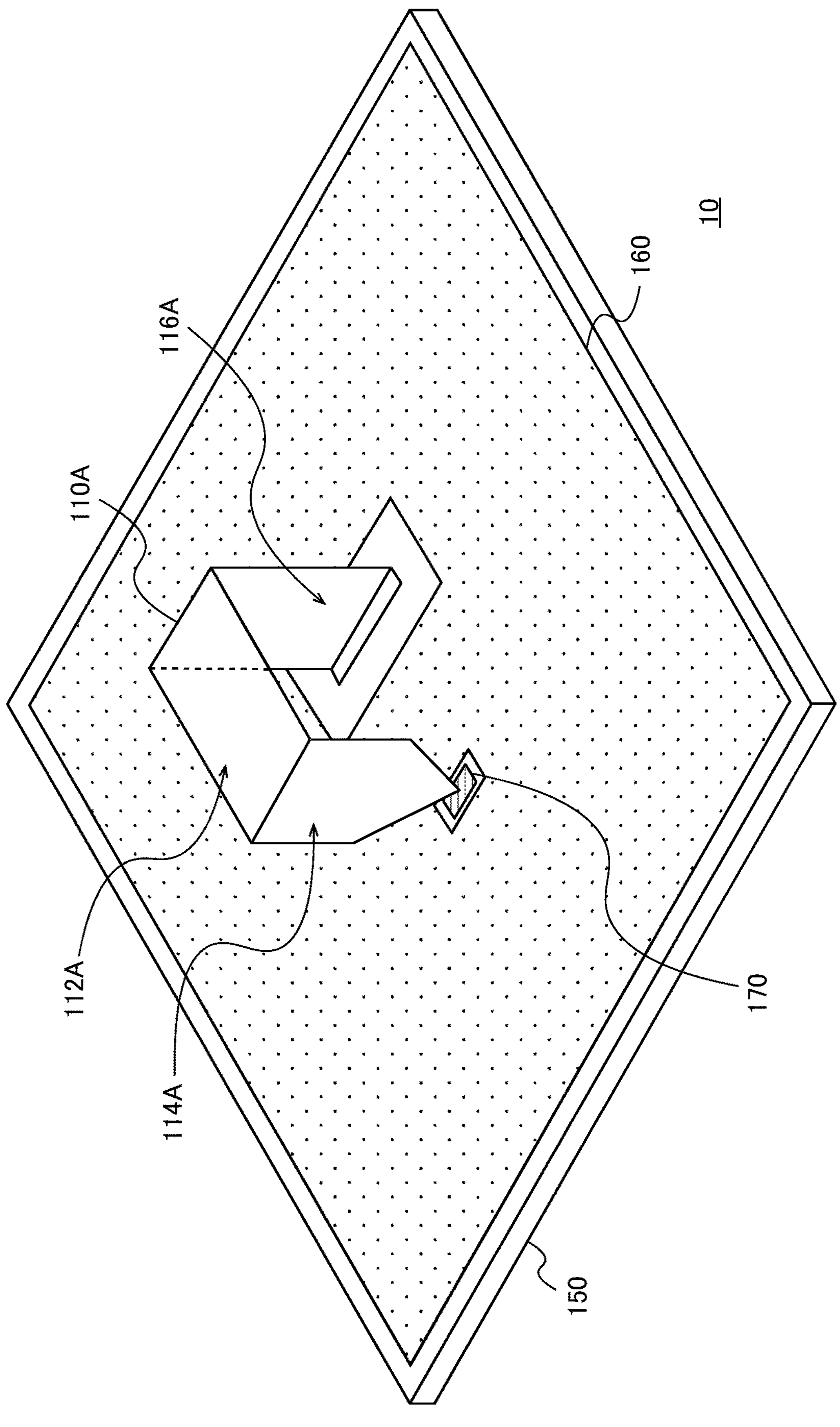
FIG. 1 is a diagram illustrating a shape example of an inverted L antenna 110 included in an antenna device 10 according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Furthermore, the same types of a plurality of existing components will be distinguished and described by assigning alphabets to ends of reference numerals in this description and the drawings in some cases. On the other hand, in a case where the same types of the plurality of existing components do not need to be distinguished, the above alphabets will be omitted, and common description will be made on all of the same types of the plurality of existing components in some cases.

1. Embodiment

<<1.1. Shape Examples of Inverted L Antenna>>

First, shape examples of an inverted L antenna 110 included in an antenna device 10 according to the embodiment of the present invention will be described with reference to FIGS. 1 to 5.

The inverted L antenna 110 according to the present embodiment transmits and receives wireless signals that conform to specific communication standards.

The inverted L antenna according to the present embodiment may be formed by one or a plurality of metal plates.

An example of the specific communication standards according to the present embodiment includes Ultra-Wide Band (UWB) wireless communication.

On the other hand, the specific communication standards according to the present embodiment are not limited to the above example. Arbitrary communication standards may be adopted for the specific communication standards according to the present embodiment.

Furthermore, the inverted L antenna 110 according to the present embodiment has been conceived focusing on more stably arranging the inverted L antenna 110 on a substrate 150, and has a characteristic shape described later.

The inverted L antenna 110 according to the present embodiment includes a parallel part 112, a power feeding point contact part 114, and a leg part 116.

The parallel part 112 according to the present embodiment may be a flat plate component that is not in contact with the substrate 150. The parallel part 112 according to the present embodiment may be arranged, for example, in substantially parallel to the substrate 150.

The power feeding point contact part 114 according to the present embodiment is extended from the parallel part 112 substantially perpendicularly to the parallel part 112, and has the lower end that is in contact with a power feeding point 170 arranged on the substrate 150.

The leg part 116 according to the present embodiment is formed separately from the power feeding point contact part 114, and is extended from the parallel part 112 substantially perpendicularly to the parallel part 112.

Furthermore, one of features is that a contact portion of the leg part 116 and the substrate 150 according to the present embodiment is electrically insulated.

According to the above feature, it is possible to transmit and receive wireless signals that conform to the specific communication standards while more stably arranging the inverted L antenna 110 on the substrate 150.

Furthermore, the inverted L antenna 110 according to the present embodiment is formed such that an antenna length defined by the lengths of the parallel part 112, the power feeding point contact part 114, and the leg part 116 is approximately ¼ of a wavelength of a wireless signal that conforms to the specific communication standards.

Hereinafter, the shape examples of the inverted L antenna 110 according to the present embodiment will be described in more detail with reference to each of FIGS. 1 to 5 in order.

An inverted L antenna 110A illustrated in FIG. 1 has the shape formed by extending a power feeding point contact part 114A from the one end of a parallel part 112A, and extending a leg part 116A from the other end of the parallel part 112A.

The power feeding point contact part 114A has the lower end that is in contact with the power feeding point 170 (indicated by a diagonal line pattern) arranged on the substrate 150.

Note that the shapes of the power feeding point contact part 114 illustrated in FIGS. 1 to 5 are merely schematically illustrated, and the power feeding point contact part 114 according to the present embodiment can take various shapes as described later.

Furthermore, the shape of the power feeding point 170 illustrated in FIG. 1 is also schematically illustrated, and the shape of the power feeding point 170 according to the present embodiment is not limited. Note that FIGS. 2 to 5 omit illustration of the power feeding point 170.

The leg part 116A has the lower end that is in contact with the substrate 150. One of the features of the antenna device 10 according to the present embodiment is that a GND 160 (indicated by a dot pattern) is not arranged at a contact portion of the leg part 116A and the substrate 150 as illustrated in FIG. 1.

That is, the contact portion of the leg part 116A and the substrate 150 according to the present embodiment is electrically insulated.

According to the above configuration, it is possible to transmit and receive wireless signals that conform to the specific communication standards while more stably arranging the inverted L antenna 110A on the substrate 150.

Note that the contact portion of the lower end of the leg part 116A and the substrate 150 may be bent as illustrated in FIG. 1. Consequently, it is possible to obtain an effect that a contact area of the leg part 116A and the substrate 150 is expanded, it is easy to form a fillet at a time of fixing using a conductive adhesive such as a solder, and, moreover, it is easy to check the formed fillet.

Note that the above bending structure may be also formed at the lower end of the power feeding point contact part 114A.

The inverted L antenna 110A according to the present embodiment can be manufactured at low cost by press-machining one metal plate.

Next, the shape of an inverted L antenna 110B according to the present embodiment will be described with reference FIG. 2.

Figure 2:
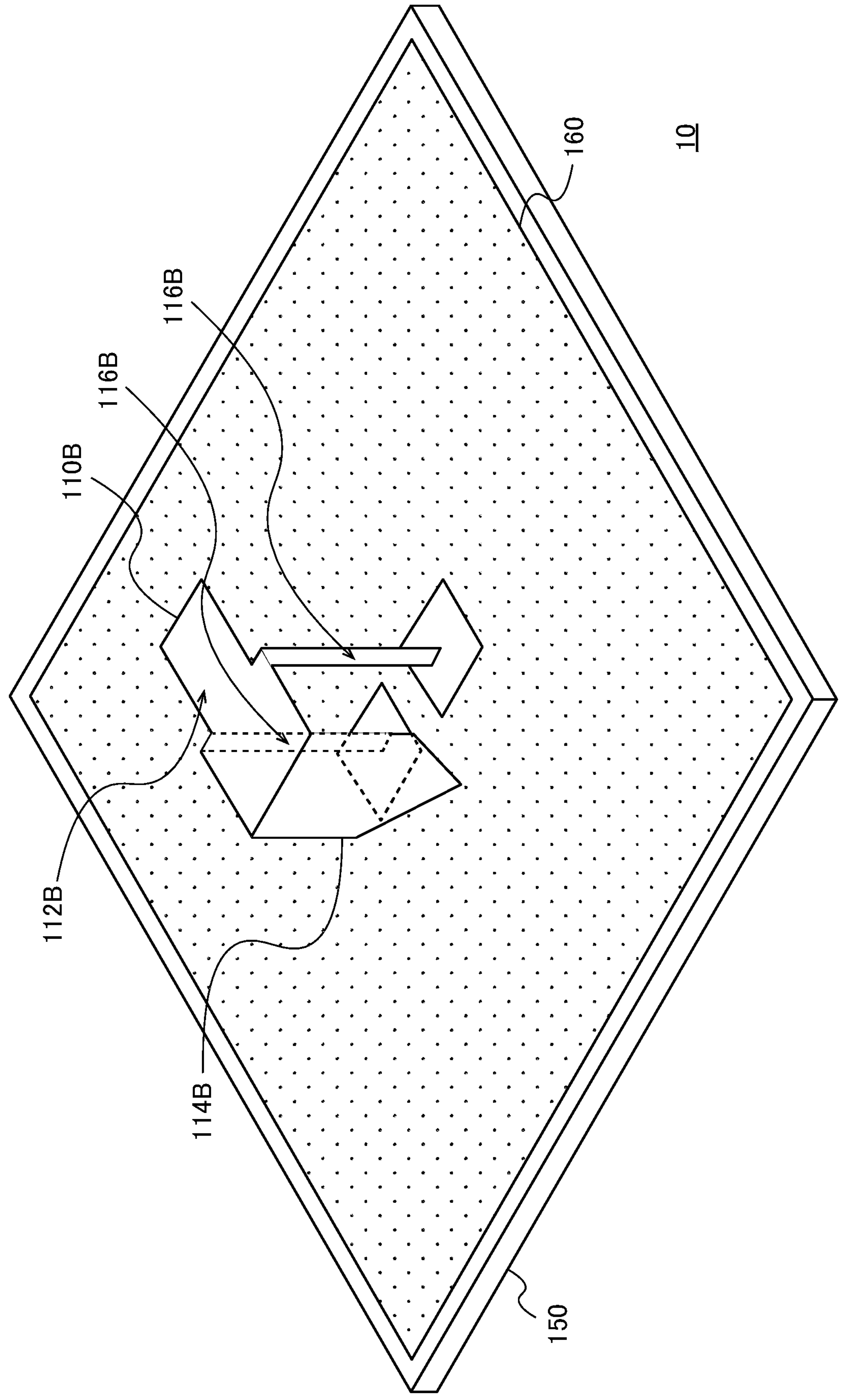
FIG. 2 is a diagram illustrating a shape example of the inverted L antenna 110 included in the antenna device 10 according to the embodiment.

The inverted L antenna 110B illustrated in FIG. 2 has the shape formed by extending a power feeding point contact part 114B from the one end of a parallel part 112B, and extending two leg parts 116B from between the one end and the other end of the parallel part 112B.

The two leg parts 116B have the lower ends that are in contact with the substrate 150. Contact portions of the leg parts 116B and the substrate 150 according to the present embodiment are electrically insulated.

According to the above configuration, it is possible to transmit and receive wireless signals that conform to the specific communication standards while more stably arranging the inverted L antenna 110B on the substrate 150.

Furthermore, the inverted L antenna 110B according to the present embodiment is supported on the substrate 150 by three support points (the power feeding point contact part 114B and the two leg parts 116B), so that an effect that stability increases is expected. Note that the above-described bending structure may be formed at the lower end of the leg part 116B.

Note that the inverted L antenna 110B according to the present embodiment can be manufactured at low cost by press-machining one metal plate.

Next, the shape of an inverted L antenna 110C according to the present embodiment will be described with reference FIG. 3.

Figure 3:
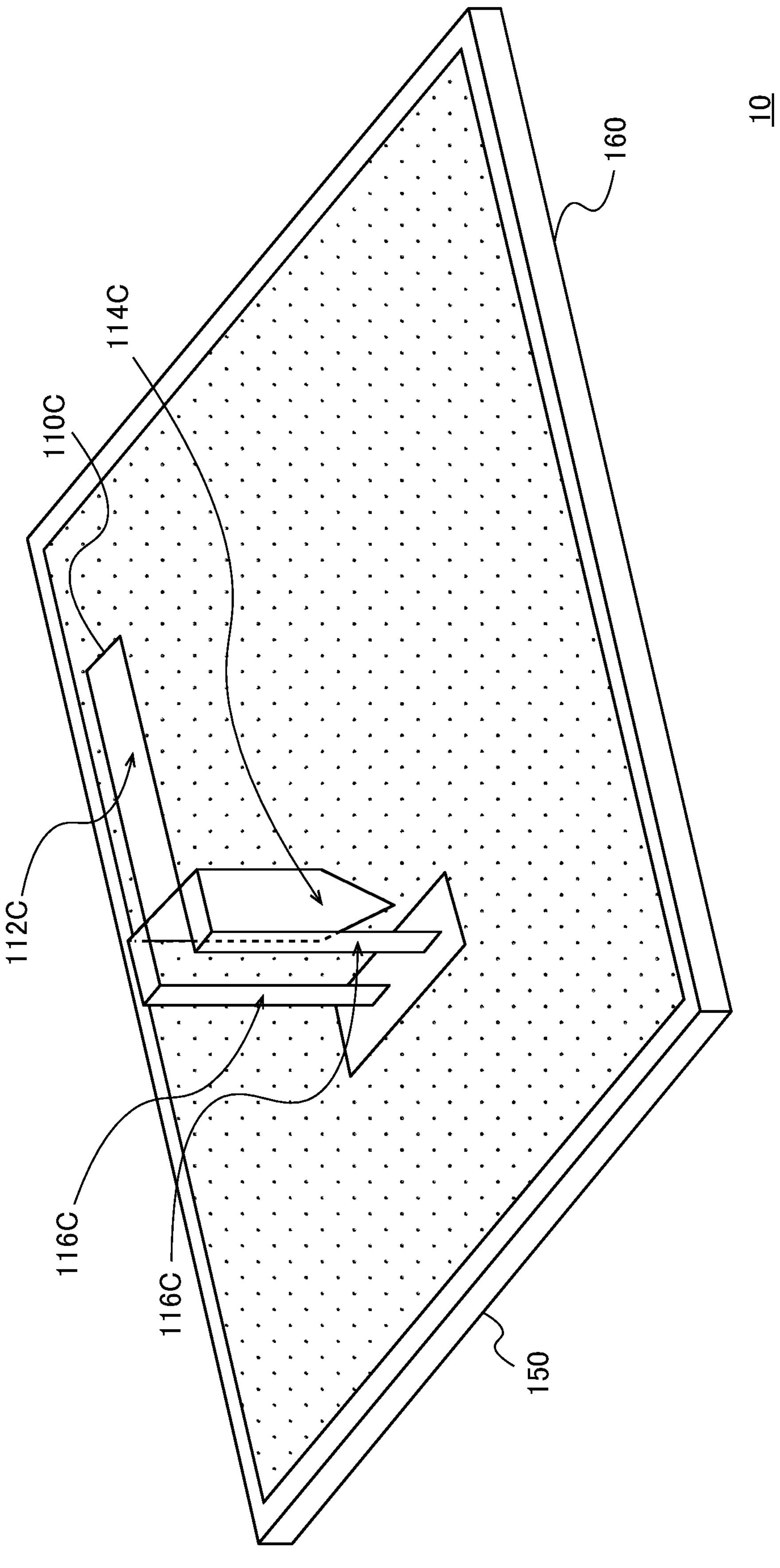
FIG. 3 is a diagram illustrating a shape example of the inverted L antenna 110 included in the antenna device 10 according to the embodiment.

The inverted L antenna 110C illustrated in FIG. 3 has the shape formed by extending the power feeding point contact part 114C from the one end of a parallel part 112C, and extending two leg parts 116C from the same one end.

The two leg parts 116C have the lower ends that are in contact with the substrate 150. Contact portions of the leg part 116C and the substrate 150 according to the present embodiment are electrically insulated.

According to the above configuration, it is possible to transmit and receive wireless signals that conform to the specific communication standards while more stably arranging the inverted L antenna 110C on the substrate 150.

Furthermore, the inverted L antenna 110C according to the present embodiment is supported on the substrate 150 by three support points (the power feeding point contact part

114C and the two leg parts 116C), so that an effect that stability increases is expected. Note that the above-described bending structure may be formed at the lower end of the leg part 116C.

The inverted L antenna 110C according to the present embodiment can be manufactured at low cost by press-machining one metal plate.

Next, the shape of an inverted L antenna 110D according to the present embodiment will be described with reference FIG. 4.

Figure 4:
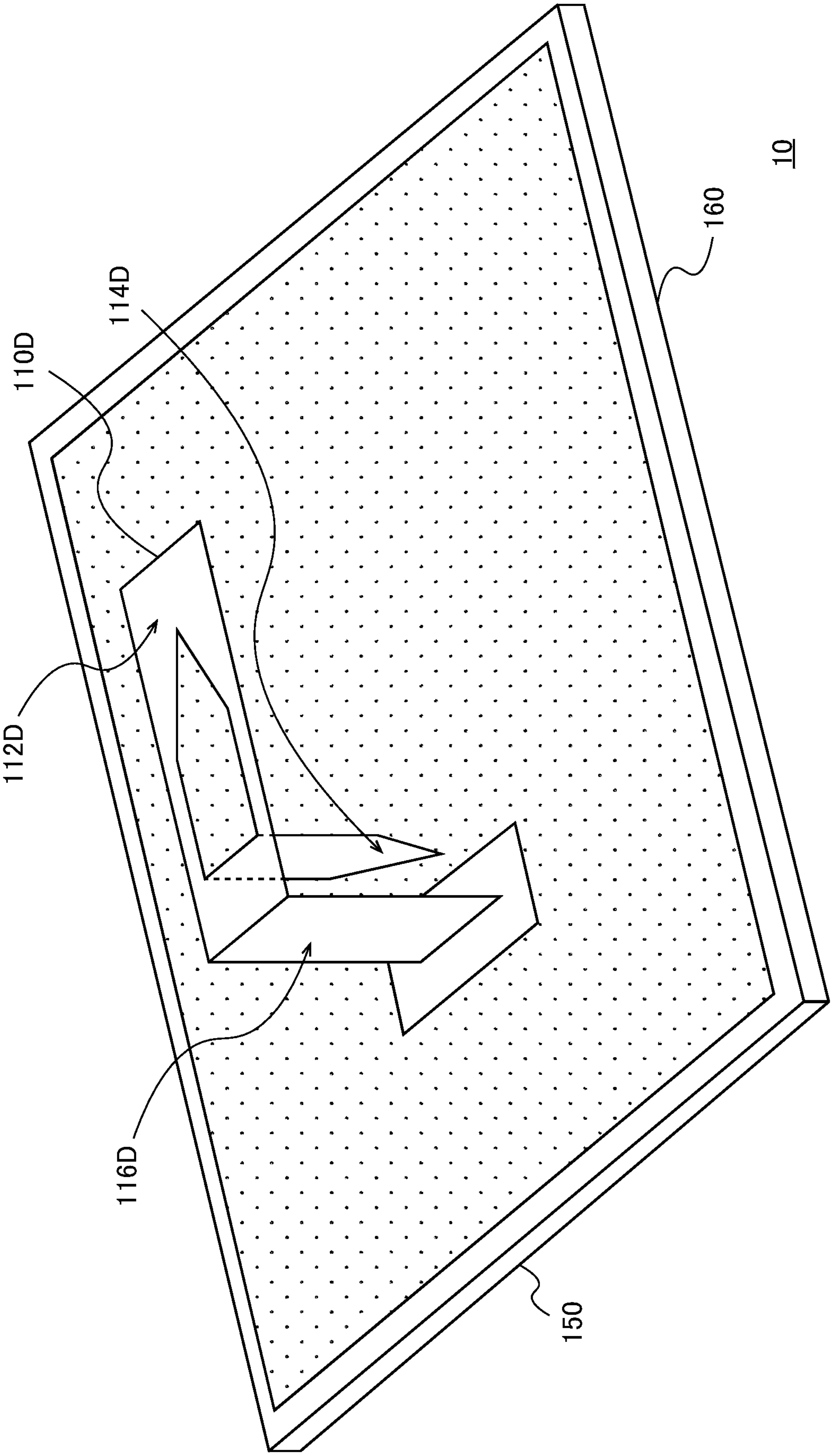
FIG. 4 is a diagram illustrating a shape example of the inverted L antenna 110 included in the antenna device 10 according to the embodiment.

In the inverted L antenna 110D illustrated in FIG. 4, a power feeding point contact part 114D is formed by cutting out part of an area of a parallel part 112D, and, moreover, a leg part 116D extends from the one end of the parallel part 112D.

The leg part 116D has the lower end that is in contact with the substrate 150. A contact portion of the leg part 116D and the substrate 150 according to the present embodiment is electrically insulated. Note that the above-described bending structure may be formed at the lower end of the leg part 116D.

According to the above configuration, it is possible to transmit and receive wireless signals that conform to the specific communication standards while more stably arranging the inverted L antenna 110D on the substrate 150.

Note that the inverted L antenna 110D according to the present embodiment can be manufactured at low cost by press-machining one metal plate.

Next, the shape of an inverted L antenna 110E according to the present embodiment will be described with reference FIG. 5.

Figure 5:
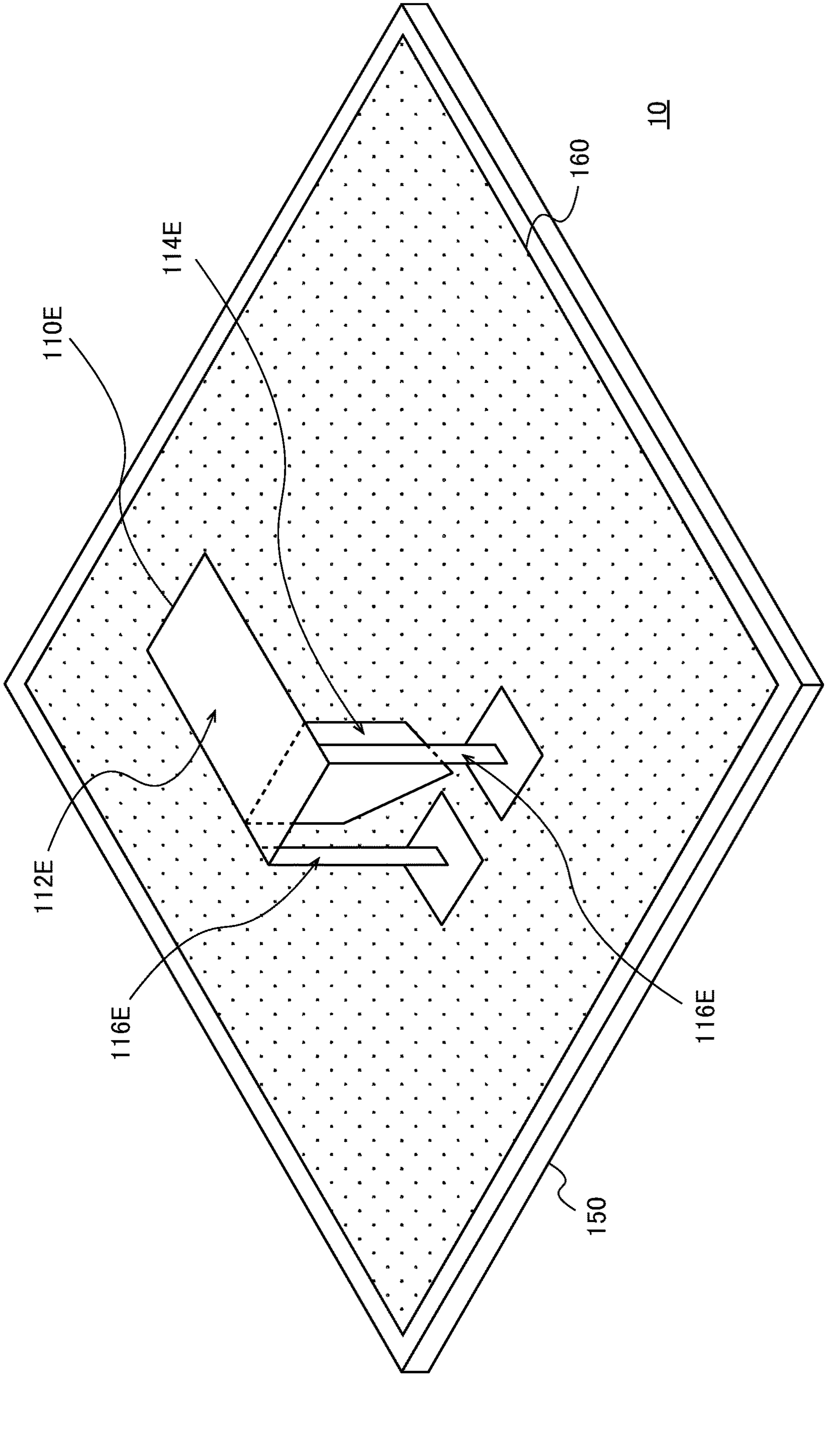
FIG. 5 is a diagram illustrating a shape example of the inverted L antenna 110 included in the antenna device 10 according to the embodiment.

In the inverted L antenna 110E illustrated in FIG. 5, a power feeding point contact part 114E extends from between the one end and the other end of a parallel part 112E, and two leg parts 116E extend from the vicinity of this one end.

The two leg parts 116E have the lower ends that are in contact with the substrate 150. Contact portions of the leg part 116E and the substrate 150 according to the present embodiment are electrically insulated. Note that the above-described bending structure may be formed at the lower end of the leg part 116E.

According to the above configuration, it is possible to transmit and receive wireless signals that conform to the specific communication standards while more stably arranging the inverted L antenna 110E on the substrate 150.

<<1.2. Modified Examples of Inverted L Antenna 110>>

The inverted L antenna 110 according to the present embodiment has been basically described above. Next, the modified examples of the inverted L antenna 110 according to the present embodiment will be described.

Note that, although description on the following modified examples will adopt the inverted L antenna 110A as a main example, the inverted L antennas 110B to 110E can be also modified likewise.

Figure 6:
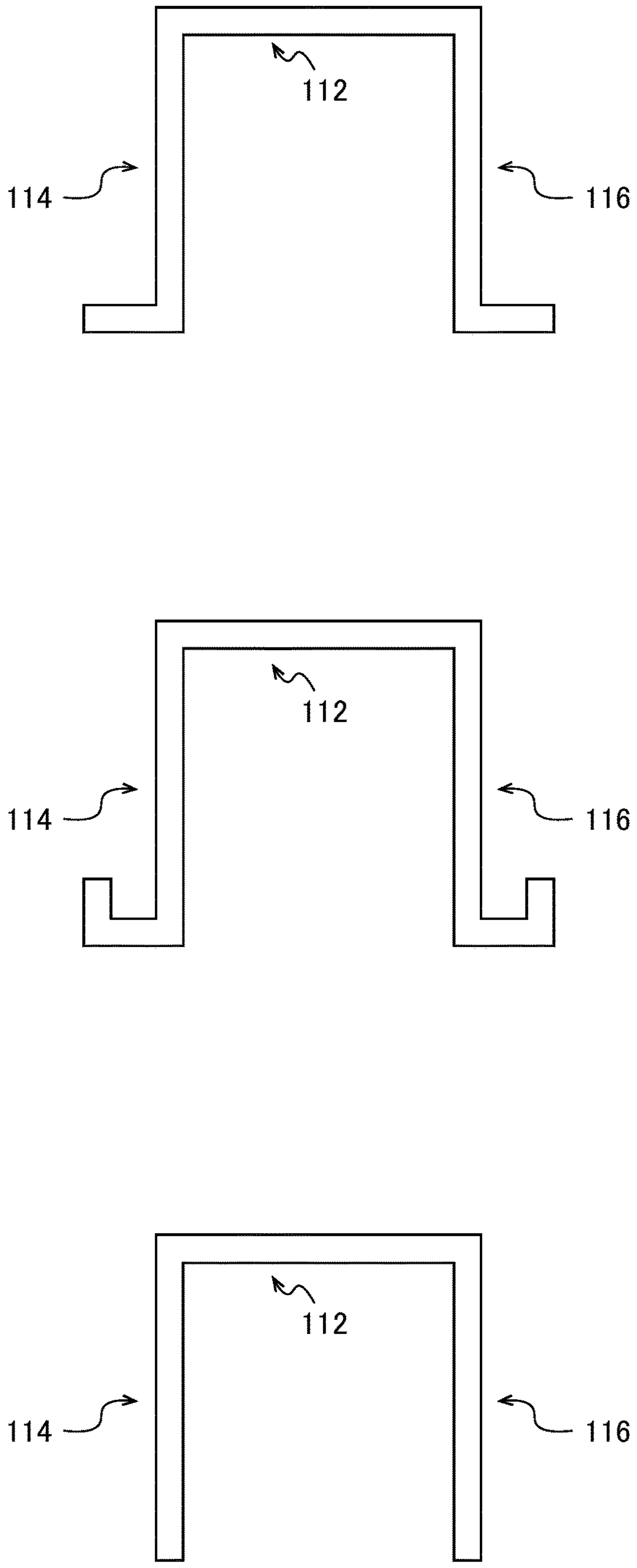
FIG. 6 is a schematic diagram for describing a modified example of a bending structure according to the embodiment.

FIG. 6 is a schematic diagram for describing the modified example of the bending structure according to the present embodiment.

As illustrated at the upper part in FIG. 6, the power feeding point contact part 114A and the leg part 116A according to the present embodiment may be bent toward an outer side of the inverted L antenna 110A. Thus, a bending direction of the bending structure according to the present embodiment is not limited to a predetermined direction.

Furthermore, as illustrated at the middle part in FIG. 6, the bending structure according to the present embodiment may be further bent in a substantially vertical direction.

In this case, there is an advantage that it is easy to form a fillet at a time of fixing using a conductive adhesive such as a solder, and, moreover, it is easy to check the formed fillet.

On the other hand, the power feeding point contact part 114A and the leg part 116A according to the present embodiment may not have the bending structures as illustrated at the lower part in FIG. 6.

Even in this case, the inverted L antenna 110A can stand by itself on the substrate 150 by being fixed using a conductive adhesive such as a solder.

Furthermore, the inverted L antenna 110A may include opening parts 210A in the vicinity just above the contact portion of the leg part 116A and the substrate 150.

The inverted L antenna 110A is formed using a metal material, and therefore has high thermal conductivity. Hence, when fixing is performed using a conductive adhesive such as a solder, heat tends to escape upward.

Figure 7:
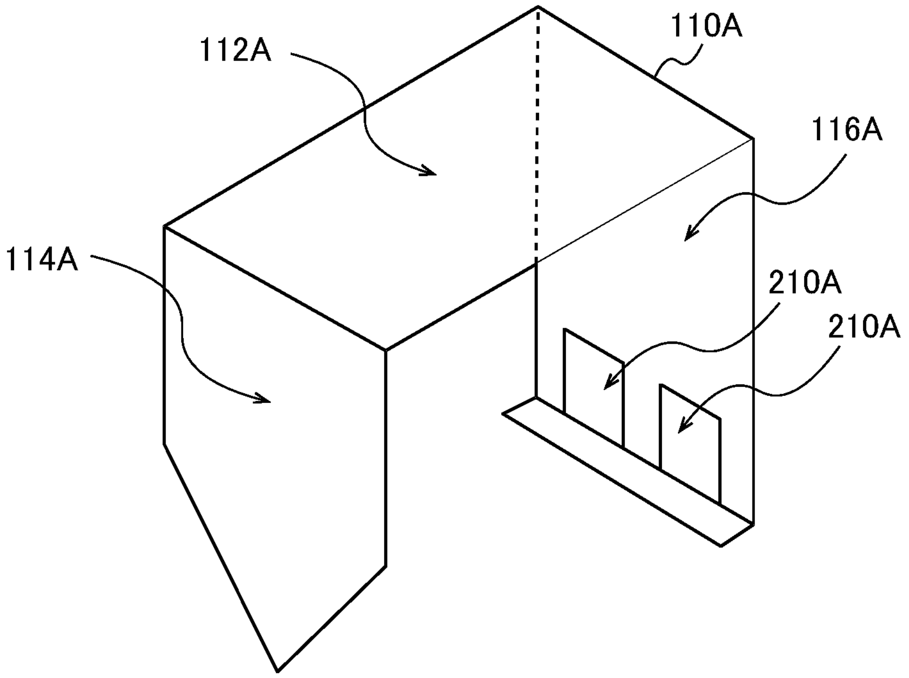
FIG. 7 is a diagram for describing opening parts 210A formed in the vicinity just above a contact portion of a leg part 116A and a substrate 150 according to the embodiment.

However, in a case where the opening parts 210 are formed in the vicinity just above the contact portion of the leg part 116A and the substrate 150 as illustrated in FIG. 7, it is possible to effectively prevent heat from escaping upward, and efficiently perform fixing using a conductive adhesive such as a solder.

Next, a modified example where an antenna length is secured will be described.

To secure the antenna length of interest, the inverted L antenna 110A according to the present embodiment may have a structure such as slits 220A for causing a current to detour.

Figure 8:
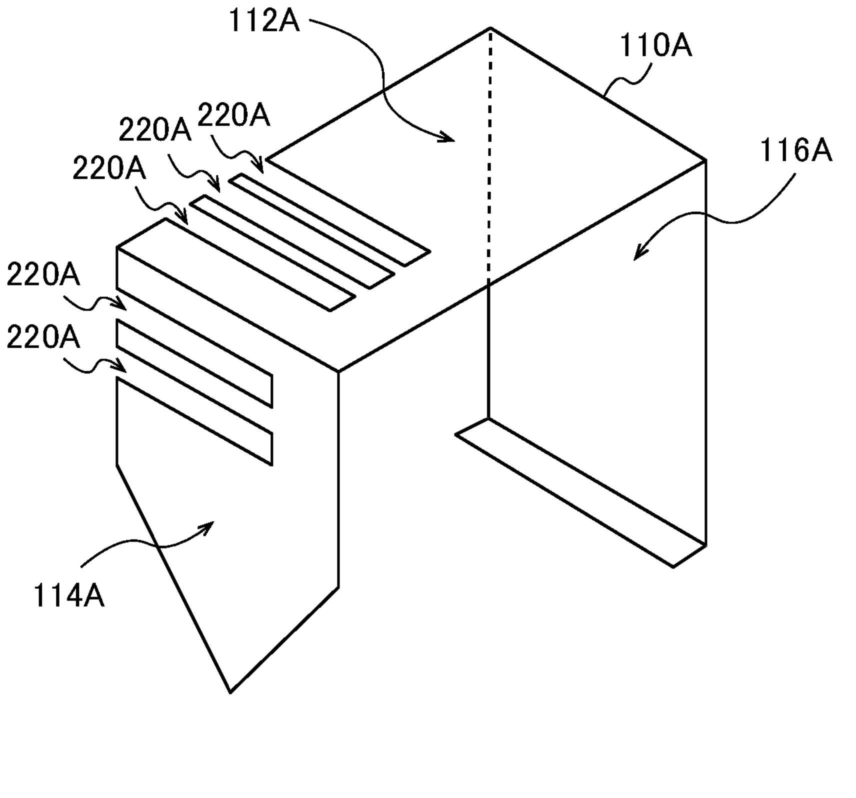
FIG. 8 is a diagram for describing slits 220A according to the embodiment.
Figure 9:
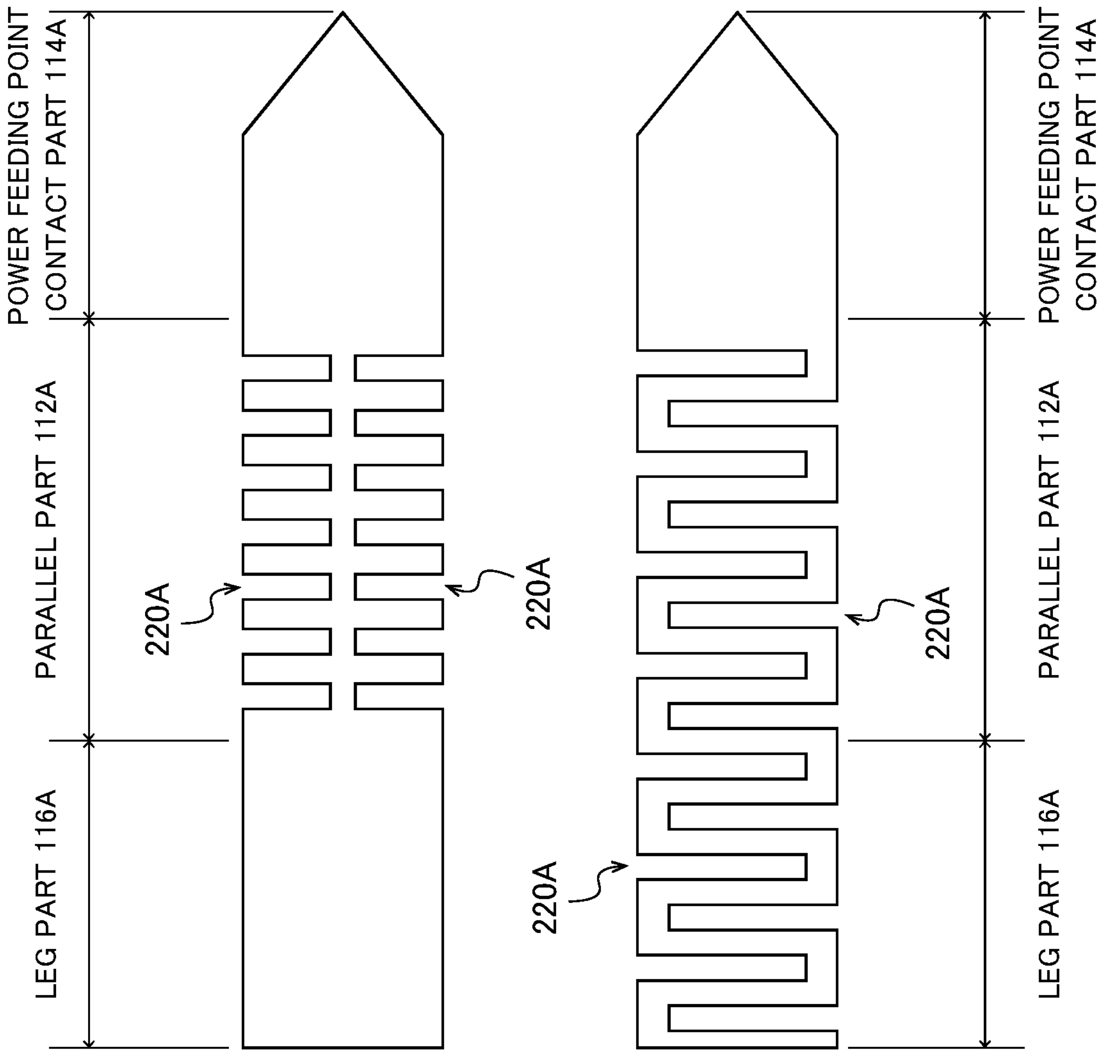
FIG. 9 is a diagram for describing the slits 220A according to the embodiment.

FIGS. 8 and 9 are diagrams for describing the slits 220A according to the present embodiment.

As illustrated in FIG. 8, the inverted L antenna 110A according to the present embodiment may include one or a plurality of the slits 220A in the parallel part 112A, the power feeding point contact part 114A, or the leg part 116A.

In a case where the inverted L antenna 110A includes the slits 220A as illustrated in FIG. 8, the current flows detouring through the slits 220A, so that it is possible to secure a longer antenna length defined by the lengths of the parallel part 112A, the power feeding point contact part 114A, and the leg part 116A.

Note that, although FIG. 8 exemplifies the case where the plurality of slits 220A are formed in the same direction, a formation pattern of the slits 220A according to the present embodiment is not limited to this example.

The slits 220A according to the present embodiment may be formed in opposing two directions as illustrated at, for example, the upper part and the lower part in FIG. 9.

Furthermore, structures that are formed in the inverted L antenna 110A and cause a current to detour are not limited to the slits 220A. The structures may be the opening parts 210A.

Figure 10:
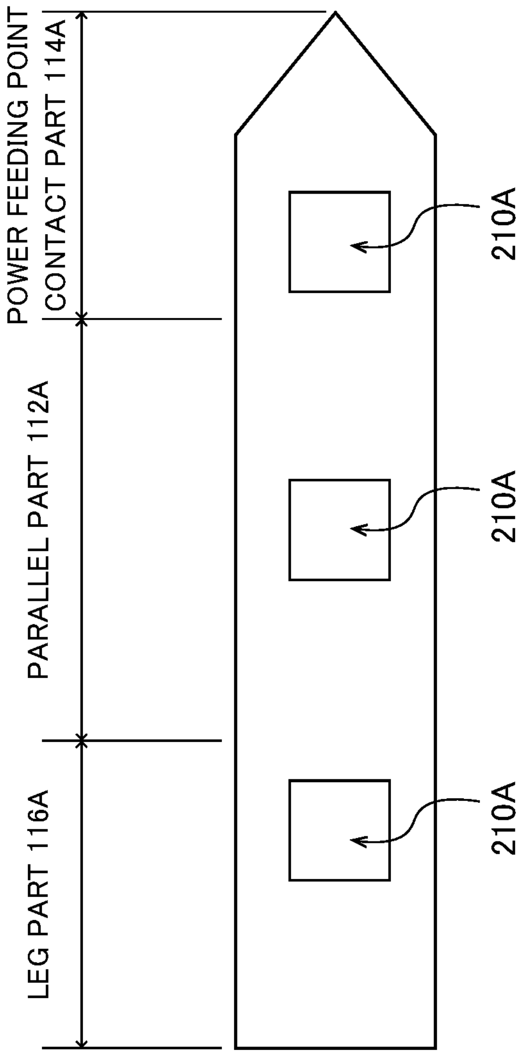
FIG. 10 is a diagram for describing the opening parts 210A that are structures for causing a current to detour according to the embodiment.

FIG. 10 is a diagram for describing the opening parts 210A as structures for causing a current to detour.

As illustrated in FIG. 10, the inverted L antenna 110A according to the present embodiment may include one or a plurality of the opening parts 210A in the parallel part 112A, the power feeding point contact part 114A, or the leg part 116A.

In a case where the inverted L antenna 110A includes the opening parts 210A as illustrated in FIG. 10, the current flows detouring through the opening parts 210A, so that it is possible to secure a longer antenna length defined by the lengths of the parallel part 112A, the power feeding point contact part 114A, and the leg part 116A.

The slits 220A and the opening parts 210A that are the structures for causing a current to detour have been described above. Formation patterns of the slits 220A and the opening parts 210A may be designed as appropriate according to an antenna length of interest, the size of the inverted L antenna 110A, and the like.

The modified example where the antenna length is secured has been described above. Next, a modified example on the shape of the power feeding point contact part 114A will be described.

Figure 11:
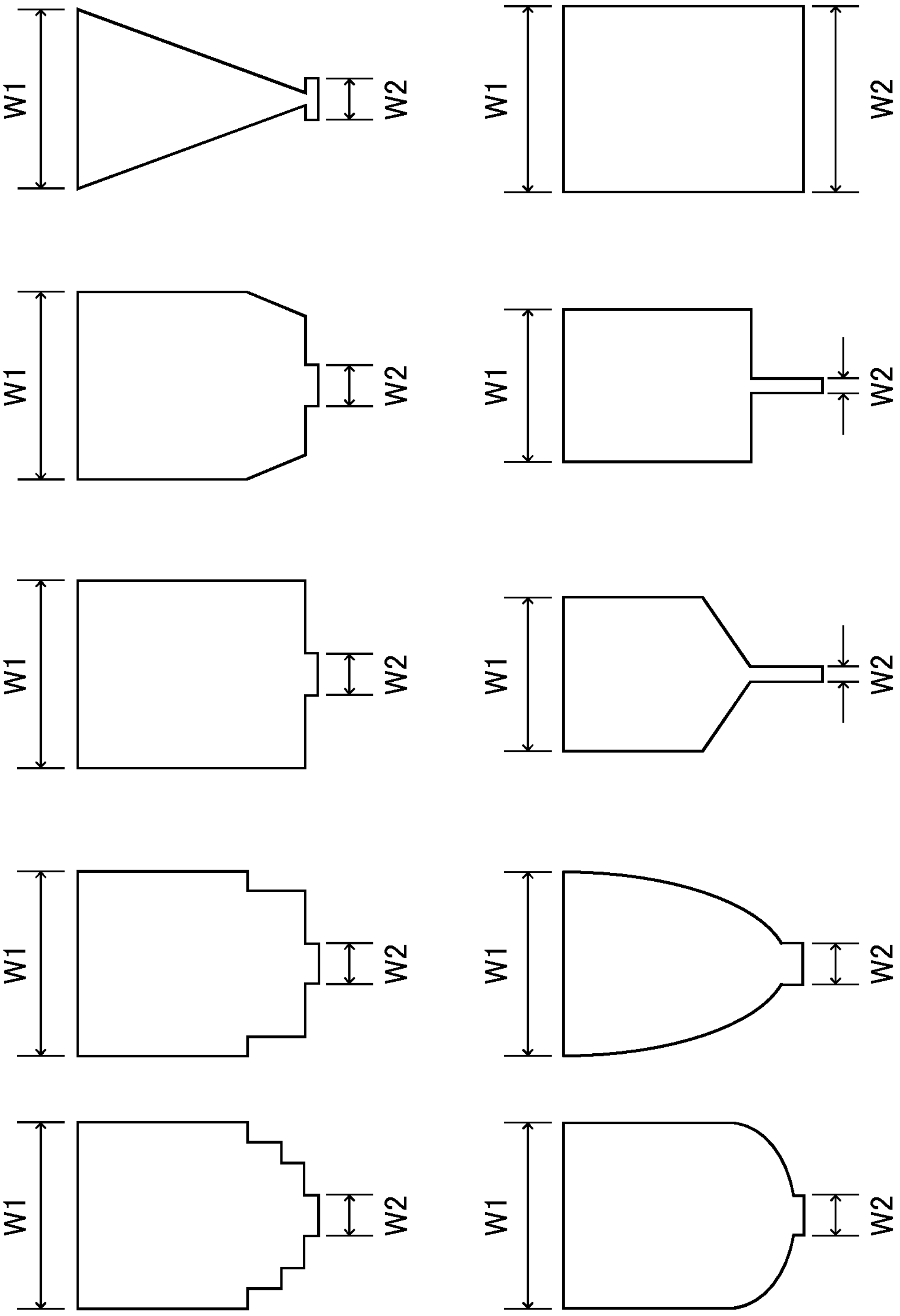
FIG. 11 is a diagram illustrating a variation example of the shape of a power feeding point contact part 114A of an inverted L antenna 110A according to the embodiment.

FIG. 11 is a diagram illustrating a variation example of the shape of the power feeding point contact part 114A of the inverted L antenna 110A according to the present embodiment.

The power feeding point contact part 114A of the inverted L antenna 110A according to the present embodiment may be formed such that a width W2 of the lower end that is in contact with the power feeding point 170 is shorter than a width W1 of the upper end.

According to the above shape, it is possible to obtain an effect that it is easy to perform impedance matching.

In this regard, in a case where impedance matching can be performed by other means, the width W2 of the lower end may be approximately the same as the width W1 of the upper end as illustrated at the right end of the lower part in FIG. 11.

Next, a modified example in a case where the inverted L antenna 110A according to the present embodiment includes stabs 240A will be described.

Figure 12:
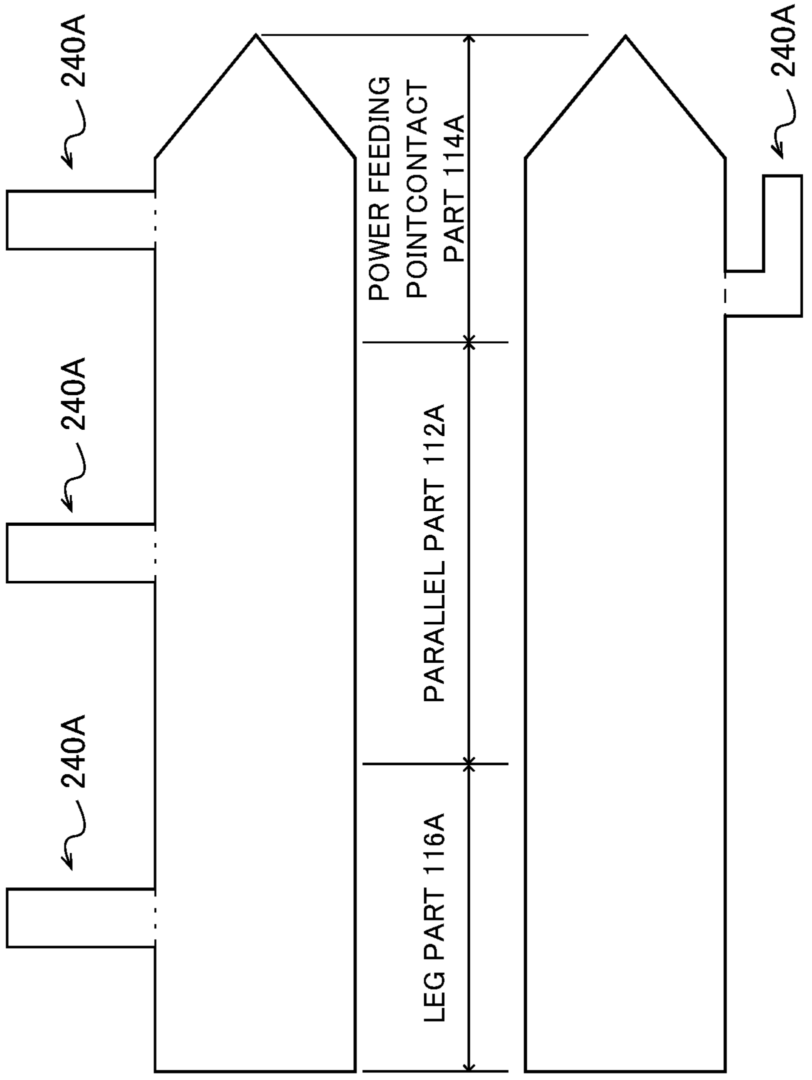
FIG. 12 is a diagram illustrating a formation example of stabs 240A according to the embodiment.

FIG. 12 is a diagram illustrating a formation example of the stabs 240A according to the present embodiment.

As illustrated in FIG. 12, the inverted L antenna 110A according to the present embodiment may include one or a plurality of the stabs 240A in one or more of the parallel part 112A, the power feeding point contact part 114A, and the leg part 116A.

As illustrated at the upper part in FIG. 12, the stabs 240A may be formed by being extended in a direction substantially perpendicularly to a direction that connects the power feeding point contact part 114A and the leg part 116A.

The stabs 240A formed as described above can cause a current to further flow in the direction perpendicular to the direction that connects the power feeding point contact part 114A and the leg part 116A, and consequently can cause the inverted L antenna 110A to function as a circularly polarized antenna.

Alternatively, as illustrated at the lower part in FIG. 12, the stab 240A may be formed by being extended in the direction substantially perpendicularly to the direction that connects the power feeding point contact part 114A and the leg part 116A, and then being further extended toward the substrate 150.

Furthermore, the stab 240A may be bent at, for example, a portion indicated by a two-dot-dash line in FIG. 12.

The stabs 240A according to the present embodiment can efficiently adjust a polarized wave and the antenna length.

Next, a mold structure according to the present embodiment will be described.

Figure 13:
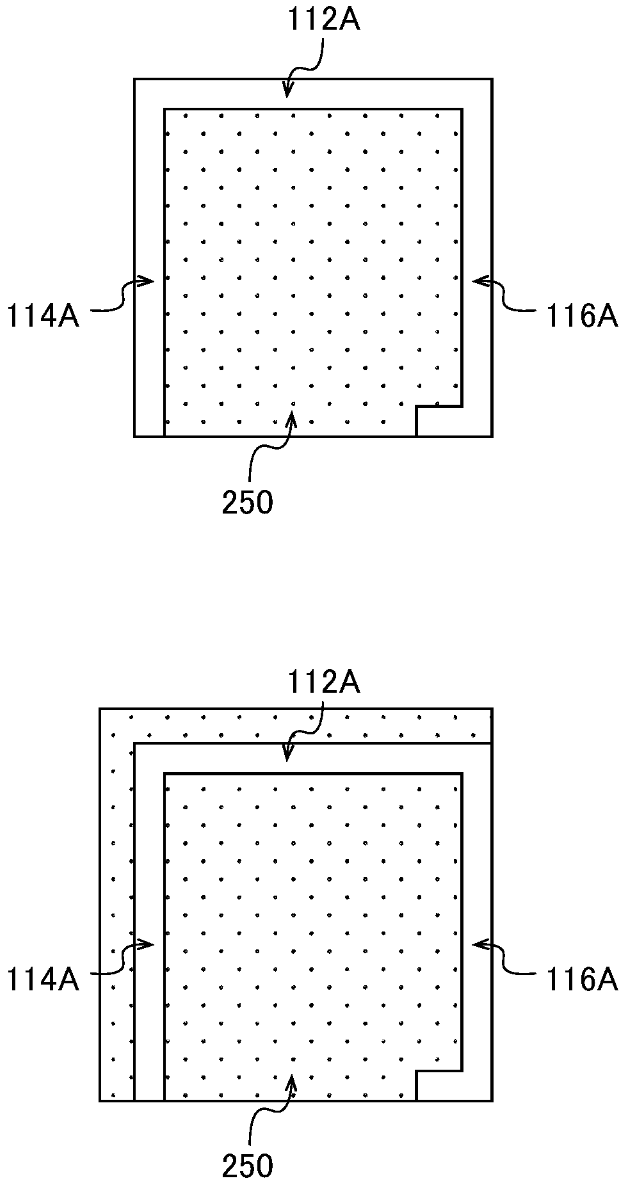
FIG. 13 is a diagram illustrating an example of a mold structure according to the embodiment.

FIG. 13 is a diagram illustrating an example of the mold structure according to the present embodiment.

As illustrated at the upper part in FIG. 13, an insulation material 250 may be filled in a space surrounded by at least two of the parallel part 112A, the power feeding point contact part 114A, and the leg part 116A according to the present embodiment.

Alternatively, as illustrated at the lower part in FIG. 13, in the inverted L antenna 110A according to the present embodiment, in addition to the above space, the outer side of at least one of the parallel part 112A, the power feeding point contact part 114A, and the leg part 116A may be covered with the insulation material 250.

This mold structure that uses the insulation material 250 can effectively prevent change of the shape of the inverted L antenna 110A.

Next, a modified example in a case where the inverted L antenna 110A according to the present embodiment includes support parts 260A will be described.

The support parts 260A according to the present embodiment are components that support the inverted L antenna 110A to stand by itself on the substrate 150.

Figure 14:
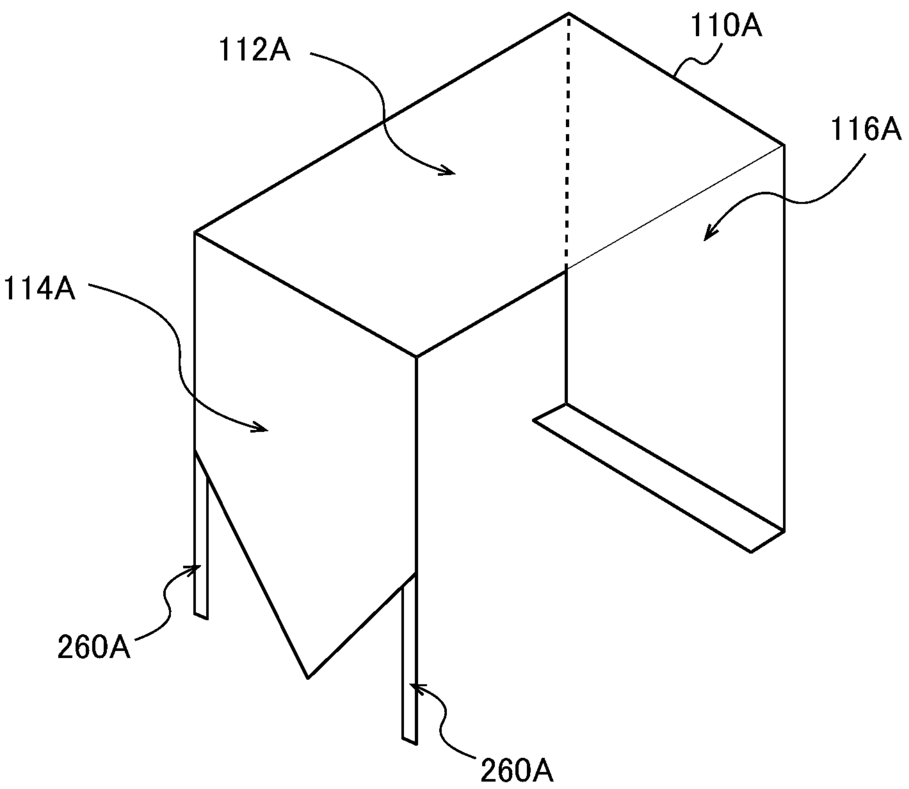
FIG. 14 is a diagram for describing a shape example of support parts 260A according to the embodiment.

FIG. 14 is a diagram for describing a shape example of the support parts 260A according to the present embodiment.

As illustrated in FIG. 14, the power feeding point contact part 114A of the inverted L antenna 110A according to the present embodiment may include one or a plurality of the support parts 260A.

The support parts 260A according to the present embodiment enable the inverted L antenna 110A to more stably stand by itself on the substrate 150.

Next, a modified example of the metal plate according to the present embodiment will be described.

The case where the inverted L antenna 110A according to the present embodiment is formed by one metal plate has been mainly described above.

On the other hand, the inverted L antenna 110A according to the present embodiment may be formed by a plurality of metal plates.

Figure 15:
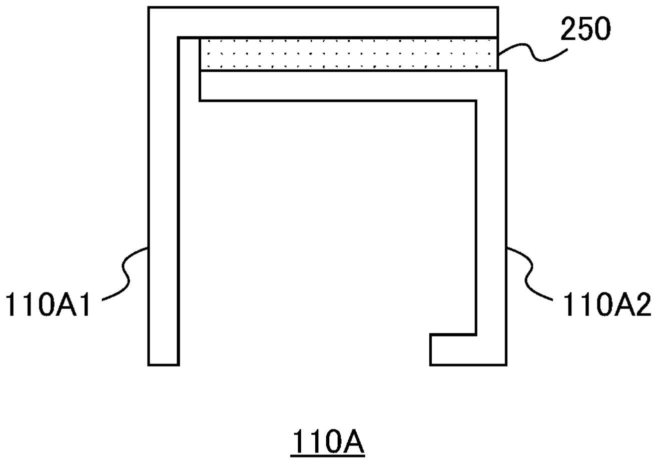
FIG. 15 is a diagram for describing the inverted L antenna 110A formed by a plurality of metal plates according to the embodiment.

FIG. 15 is a diagram for describing the inverted L antenna 110A formed by a plurality of metal plates according to the present embodiment.

As illustrated in FIG. 15, the inverted L antenna 110A according to the present embodiment may be formed by a metal plate 110A 1 and a metal plate 110A2.

While a region between the metal plate 110A1 and the metal plate 110A2 is not directly conducted, the region operates as a capacitor, so that it is possible to perform conduction at a high frequency, and it is also possible to implement an antenna function of the inverted L antenna 110A.

Note that, for example, the insulation material 250 may be filled in the region between the metal plate 110A1 and the metal plate 110A2 as illustrated in FIG. 15.

In this case, it is possible to more stably keep the shape (structure) of the inverted L antenna 110A.

<2. Supplement>

Heretofore, preferred embodiments of the present invention have been described in detail with reference to the appended drawings, but the present invention is not limited thereto. It is obvious that a person skilled in the art can arrive at various alterations and modifications within the scope of the technical ideas defined in the claims, and it should be naturally understood that such alterations and modifications are also encompassed by the technical scope of the present invention.

What is claimed is:

1. An inverted L antenna arranged on a substrate, the inverted L antenna comprising:

a parallel part arranged in substantially parallel to the substrate;

a power feeding point contact part extended from the parallel part substantially perpendicularly to the parallel part; and a leg part formed separately from the power feeding point contact part, and extended from the parallel part substantially perpendicularly to the parallel part, wherein the leg part includes an extension portion that extends from the parallel part and is electrically conductive with the parallel part and the power feeding contact part, and a contact portion, and the contact portion of the leg part that contacts the substrate is electrically insulated.

2. The inverted L antenna according to claim 1, wherein the inverted L antenna is formed such that an antenna length defined by lengths of the parallel part, the power feeding point contact part, and the leg part is approximately ¼ of a wavelength of a wireless signal that conforms to specific communication standards.

3. The inverted L antenna according to claim 1, wherein the inverted L antenna is formed by one metal plate.

4. The inverted L antenna according to claim 1, wherein at least one of the parallel part, the power feeding point contact part, and the leg part includes a slit or an opening part.

5. The inverted L antenna according to claim 1, wherein at least one of the parallel part, the power feeding point contact part, and the leg part includes a stab.

6. The inverted L antenna according to claim 1, wherein a width of a lower end of the power feeding point contact part is formed shorter than a width of an upper end.

7. The inverted L antenna according to claim 1, wherein an insulation material is filled in at least one of between the parallel part, the power feeding point contact part, and the leg part.

8. The inverted L antenna according to claim 1, wherein the inverted L antenna is formed by a plurality of metal plates that are not in contact with each other.

9. The inverted L antenna according to claim 2, wherein the specific communication standards include ultra-wide band wireless communication.

10. An antenna device comprising:

a substrate; and an inverted L antenna arranged on a substrate, wherein the inverted L antenna includes:

a parallel part arranged in substantially parallel to the substrate;

a power feeding point contact part extended from the parallel part substantially perpendicularly to the parallel part; and a leg part formed separately from the power feeding point contact part, and extended from the parallel part substantially perpendicularly to the parallel part, the leg part includes an extension portion that extends from the parallel part and is electrically conductive with the parallel part and the power feeding contact part, and a contact portion, and the contact portion of the leg part that contacts the substrate is electrically insulated.

* * * * *